United States Patent [19]
Hiramatsu et al.

[11] Patent Number: 5,964,244
[45] Date of Patent: Oct. 12, 1999

[54] PILOT-OPERATED DIRECTIONAL CONTROL VALVE

[75] Inventors: Kazuo Hiramatsu; Makoto Ishikawa, both of Ibaraki, Japan

[73] Assignee: SMC Corporation, Tokyo, Japan

[21] Appl. No.: 09/162,997

[22] Filed: Sep. 30, 1998

[30] Foreign Application Priority Data

Oct. 20, 1997 [JP] Japan .................................. 9-304855

[51] Int. Cl.$^6$ .................................................. F15B 13/043
[52] U.S. Cl. ...................................... 137/270; 137/625.64
[58] Field of Search ............................... 137/270, 625.64

[56] References Cited

U.S. PATENT DOCUMENTS

| | | |
|---|---|---|
| 2,295,111 | 9/1942 | Hemmings . |
| 5,086,803 | 2/1992 | Nakajima .................. 137/270 |
| 5,222,715 | 6/1993 | Framberg . |
| 5,487,409 | 1/1996 | Stoll et al. . |
| 5,615,710 | 4/1997 | Sato ..................................... 137/625.64 |

FOREIGN PATENT DOCUMENTS

| | | |
|---|---|---|
| 2 257 837 | 8/1975 | France . |
| 11 27 675 | 4/1962 | Germany . |
| 64-17078 | 1/1989 | Japan . |
| 1-163270 | 11/1989 | Japan . |
| 1-174684 | 12/1989 | Japan . |

*Primary Examiner*—Gerald A. Michalsky
*Attorney, Agent, or Firm*—Oblon, Spivak, McClelland, Maier & Neustadt, P.C.

[57] ABSTRACT

A valve body of a main valve comprises a first and a second body portions, and grooves and shallow dents are formed in both body portions to form pilot fluid channels and a plug chamber in which a switching plug is accommodated. The switching plug that switches a directional control valve between the internal and external pilot types is accommodated in such a way that its axial direction can be changed by 180°.

2 Claims, 3 Drawing Sheets

5,964,244

PILOT-OPERATED DIRECTIONAL CONTROL VALVE

FIELD OF THE INVENTION

The present invention relates to a pilot-operated directional control valve capable of changing between the internal and external pilot methods of introducing a pilot fluid.

PRIOR ART

The pilot-operated directional control valve is a type of directional control valve used to switch the flow of a pressure fluid such as compressed air. A pilot-operated directional control valve is composed of a main valve and a pilot valve, and switches a valve disc in the main valve by allowing a pilot fluid supplied from the pilot valve to act on the valve disc.

Such pilot-operated directional control valves are classified into internal and external pilot types, depending on the method used to supply a pilot fluid. The internal pilot-operated directional control valve guides part of a main fluid from a supply port in the main valve to the pilot valve, where it functions as a pilot fluid. With the external pilot-operated directional control valve, on the other hand, the pilot fluid is distinct from the main fluid, and is guided to the pilot valve through an external pipe connected an external pilot port. The type of valve selected depends on the working conditions, and any change in working conditions can often require an internal pilot type to be changed for an external pilot type, or vice versa.

To deal with this situation, directional control valves have been proposed that include a directional control mechanism for switching between the internal pilot type and the external pilot type, as disclosed in Japanese Utility Model Laid Open No. 64-17078 or Japanese Utility Model Laid Open No. 1-163270.

In the conventional directional control valves, however, a hole in which the switching mechanism is accommodated and a plurality of pilot channels leading to this hole are formed by opening holes inside a valve body, making processing of these valves very cumbersome. In particular, the operations for forming holes of different diameters and arranging multiple bent pilot channels in such a way that they do not mutually interfere are complex and require considerable time and labor.

DISCLOSURE OF THE INVENTION

This invention is intended to provide a pilot-operated directional control valve, including a switching mechanism for switching between the internal pilot type and the external pilot type, wherein a hole in which the switching mechanism is accommodated and pilot channels leading to this hole are formed simply.

To achieve this invention, a directional control valve according to this invention is characterized in that a valve body of a main valve comprises a first and a second body portions and that some of a plurality of pilot fluid channels and a plug chamber in which a switching plug is accommodated that switches the connections among these channels, are provided between the first body portion and the second body portion.

According to an invention of this configuration, the channels and the plug chamber can be formed by forming grooves and shallow dents in the first or second body portion, thereby simplifying processing and assembly considerably relative to conventional products in which deep holes of different diameters or bent through-holes are formed inside a single body.

According to a specific embodiment of this invention, the plug chamber is formed to extend across both the first and second body portions. An external pilot valve seat is provided in the first body portion, while an internal pilot valve seat is provided in the second body portion, and the pilot input channel is opened between both valve seats. The switching plug is accommodated in the plug chamber in such a way that its axial direction can be changed by 180°, and is equipped with a valve disc the direction of which is changed to selectively close one of the two valve seats; and a communication passage that allows an open valve seat and the pilot input channel to communicate mutually.

According to this invention, an amplifying valve that is switched by the pilot valve to supply or discharge a pilot fluid to or from the main valve can be provided between the main valve and the pilot valve.

BRIEF DESCRIPTION OF THE INVENTION

DETAILED DESCRIPTION

Figure 1:
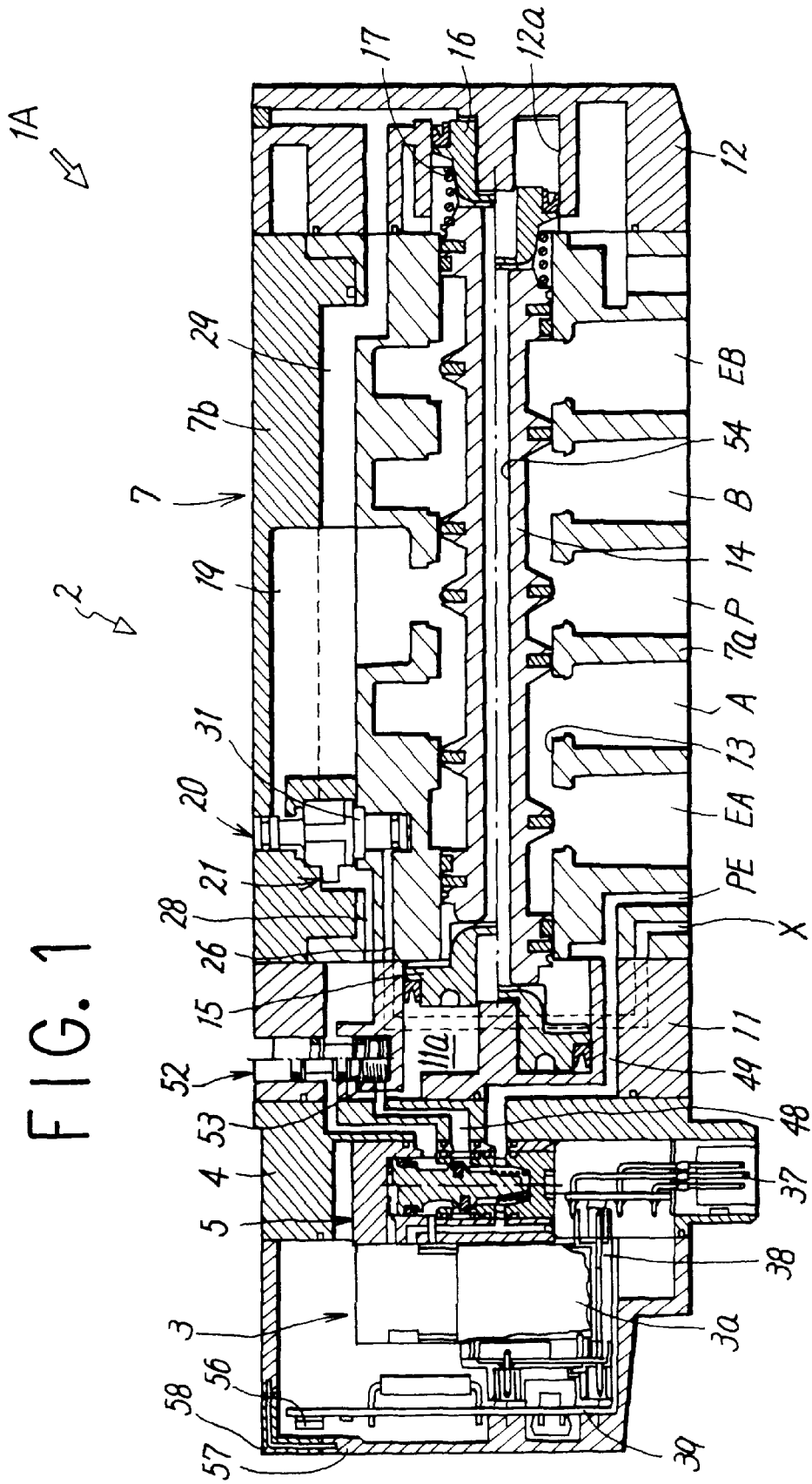
FIG. 1 is a vertically sectional front view showing a first embodiment of a directional control valve according to this invention.
Figure 2A:
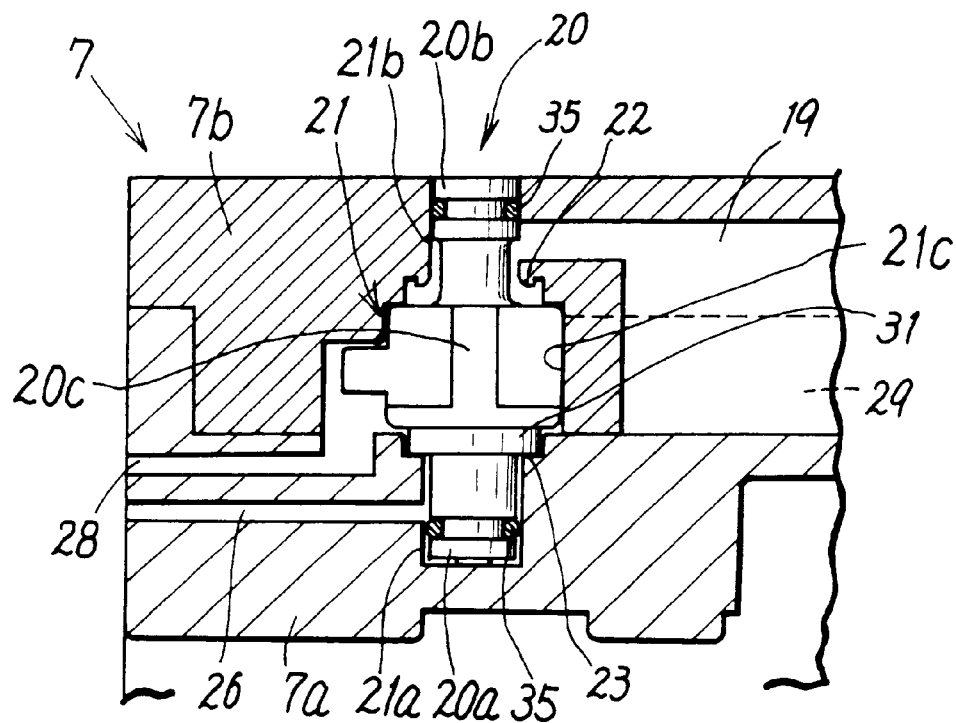
FIGS. 2A and 2B are enlarged sectional views showing that the direction of a channel-switching plate is changed.
Figure 2B:
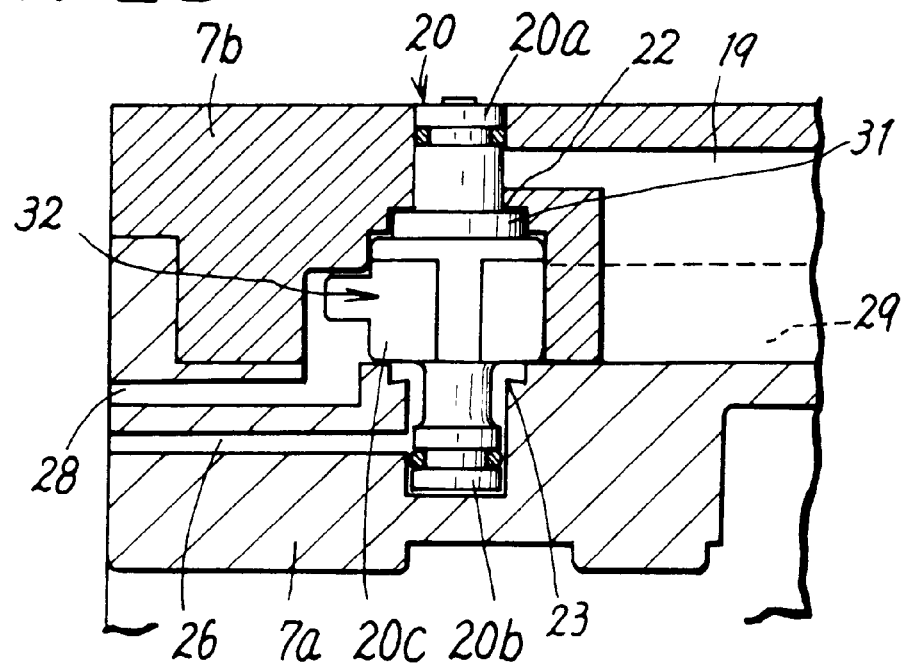
Figure 3:
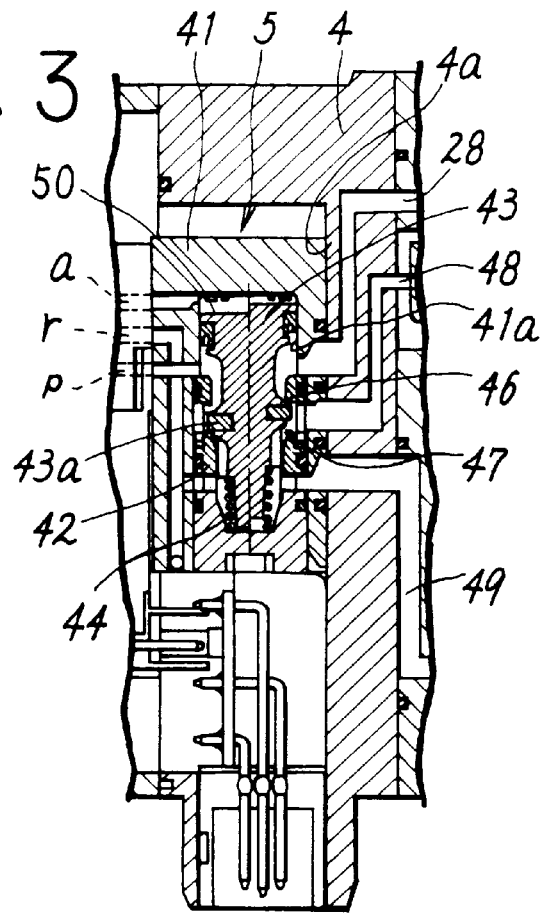
FIG. 3 is an enlarged sectional view showing the structure of an amplifying valve.

FIGS. 1 to 3 show a first embodiment of a pilot-operated directional control valve according to this invention. This directional control valve 1A is of a single pilot type and comprises a main valve 2 that switches a channel for a main fluid, a pilot valve 3 driven by a solenoid 3a, and an amplifying valve assembled into an adapter plate 4 between the main valve 2 and the pilot valve 3.

The main valve 2 comprises a valve body 7 shaped like a long rectangular parallelepiped, and a first and a second piston boxes 11 and 12 mounted on the respective axial sides of the valve body 7. The valve body 7 is composed of a first body portion 7a occupying the most of the valve body and a second body portion 7b detachably mounted on the top surface of the first portion 7a using screws.

The valve body 7 includes a pressure fluid supply port P provided at the center of the bottom surface of the first body portion 7a; a first and a second output ports A and B provided on the respective sides of the supply port P at an almost equal interval therefrom; a first and a second ejection ports EA and EB provided on the respective sides of the output ports A and B at an almost equal interval from the respective output ports; and a valve hole 13 into which these ports are opened. A valve disc 14 that switches the channel between the outputs ports A, B and the supply port P and ejection ports EA, EB is slidably inserted into the valve hole 13.

In addition, an external pilot port X and a pilot ejection port PE that ejects a pilot fluid to the exterior are provided in the valve body 7 towards the first piston box 11.

A first pressure chamber 11a having a larger diameter than the valve hole 13 is formed in the first piston box 11, and a first piston 15 is inserted into the first pressure chamber 11a in an airtight manner. In addition, a second pressure chamber 12a having a smaller diameter than the first pressure chamber 11a is formed in the second piston box 12, and a second piston 16 is inserted into the second pressure chamber 12a. A return spring 17 that urges the valve disc 13 toward the first piston 15 is provided between the second piston 16 and the valve disc 13.

A plug chamber 21 in which a switching plug 20 is accommodated and which changes the directional control valve between the internal pilot type and the external pilot type is formed between the first and second body portions 7a and 7b of the valve body 7. As seen in FIG. 2, the plug chamber 21 is formed in such a way as to extend across both the first and second body portions 7a and 7b due to dents provided in the respective portions. An external pilot channel 26 in communication with the external pilot port X is opened into a chamber portion 21a formed in the first body portion 7a, and an external pilot valve seat 23 in communication with the channel 26 is also provided in the chamber portion 21a. An internal pilot channel 19 branching from the supply port P is opened into a chamber portion 21b formed in the second body portion 7b, and an internal pilot valve seat 22 in communication with the channel 19 is also provided in the chamber portion 21b. Furthermore, a pilot input channel 28 in communication with a pilot inlet port (p) in the pilot valve 3 and a pilot return channel 29 that constantly guides a pilot fluid to the second pressure chamber 12a are opened into a chamber portion 21c located between both valve seats 22 and 23.

The internal pilot channel 19 is formed from a groove cut into the second body portion 7b, and the pilot input channel 28 and the return channel 29 are formed from a groove cut into the second body portion 7b and a hole provided in the first body portion 7a. In this manner, the channels and the plug chamber are formed by providing grooves and shallow dents in the first or second body portion 7a or 7b, making both processing and assembly much simpler than in conventional products in which deep holes of different diameters or bent through-holes are formed inside a single body.

The switching plug 20 consists of two ends 20a and 20b of the same diameter that are closely fitted in the chamber portions 21a and 21b of the same diameter at the respective ends of the plug chamber 21 using seal rings 35; and an intermediate portion 20c of a larger diameter that is fitted in the chamber portion 21c of a larger diameter. The switching plug is accommodated in the plug chamber 21 in such a way that its axial direction can be changed by 180°. A poppet valve disc 31 is provided at one of the axial ends of the intermediate portion 20c to allow one of the two valve seats 22 and 23 to be selectively closed when the direction of the switching plug 20 is changed by 180°. The entire intermediate portion 20c except for the valve disc 31 is formed to have a cross-shaped cross section, and its dented portion forms a communication path allowing one of the valves 22 and 23 which is open and the pilot input channel 28 to communicate mutually.

The pilot valve 3 is configured as a three-port solenoid-operated valve, and comprises a pilot inlet port (p), a pilot outlet port (a), and a pilot ejection port (r) (for the ports (p), (a), and (r), see FIG. 3). The solenoid 3a is magnetized and demagnetized to switch the pilot output port (p) between the pilot inlet port (a) and the pilot ejection port (r) for communication.

In terms of communication, the pilot inlet port (p) is in communication with the pilot input channel 28 via the amplifying valve 5, as described above; the pilot output port (a), with a pressure chamber 50 in the amplifying valve 5; and the pilot ejection port (r), with the pilot ejection port PE through a pilot ejection channel 49.

In addition, the solenoid 3a is supplied with power from a feeding plug 37 provided in the adapter plate 4, via an electric connector 38 and a printed circuit board 39 provided under the pilot valve 3 and on one side thereof, respectively.

The amplifying valve 5, which is shown in FIG. 3 in detail, comprises an amplifying valve body 41 mounted in a mounting chamber 4a formed in the adapter plate 4; a valve seat member 42 mounted in an airtight manner in a sliding hole 41a located in the axial direction of the valve body 41; an amplifying valve disc 43 that slides through the sliding hole 41a in an airtight manner; and a return spring 44 that returns the amplifying valve disc 43 to its original position.

An output valve seat 46 and an ejection valve seat 47 are formed opposite in the valve seat member 42. The space between the valve seats is in communication with the first pressure chamber 11a through the pilot output channel 48. In addition, the pilot input channel 28 is opened in the space in the sliding hole 41a located above the output valve seat 46, the space below the ejection valve seat 47 is in communication with the pilot ejection channel PE through the pilot ejection channel 49, and the pressure chamber 50 between the amplifying valve body 41 and the amplifying valve disc 43 is in communication with the pilot output port (a).

The amplifying valve disc 43 includes a valve disc 43a that opens and closes the output and ejection valve seats 46 and 47 by means of sliding.

A manually operated device 52 that enables a manual operation for allowing the pilot input channel 28 to communicate directly with the first pressure chamber 11a without using the amplifying valve 5 or the pilot valve 3 is provided in the first piston box 11 in such a way that the device can be pressed downward in the figure. The manually operated device 52 is normally positioned above in the figure by the urging force of the return spring 53 to allow the pilot input channel 28 to communicate with the pilot inlet port (p), and when pressed, allows the pilot input channel 28 to communicate directly with the first pressure chamber 11a.

Thus, when the pilot valve 3 cannot be operated by the solenoid 3a due to an accident such as a service interruption or during a test operation, the manually operated device 52 can be pressed and released to drive the valve disc 14.

A passage 54 that allows breathing chambers behind the first and second pistons 15 and 16 to communicate mutually is formed in the valve disc 14, and the breathing chamber behind the first piston 15 is in communication with the pilot ejection port PE through the pilot ejection channel 49.

Reference numeral 56 in FIG. 1 is an indicator lamp indicating that power is being supplied to the solenoid 3a mounted on the printed circuit board 39, and a transparent or semi-transparent indicating window 58 through which the operator visually checks whether the indicator lamp 56 is lit is provided in a cover 57 covering the pilot valve 3 and the printed circuit board 39.

FIGS. 1 and 2A shows that the directional control valve 1A acts as the internal pilot type when the switching plug 20 is mounted in the direction in which the valve disc 31 closes the external pilot valve seat 23 while the internal pilot channel 19 and the pilot input channel 28 mutually communicate through the internal pilot valve seat 22. Thus, a pilot fluid is supplied to the pilot valve 3 and the amplifying valve 5 from the supply port P through the internal pilot channel 19 and the pilot input channel 28.

FIG. 1 shows that the solenoid 3a is demagnetized. Since the pilot outlet port (a) in the pilot valve 3 is in communication with the pilot ejection port (r) and the amplifying valve disc 43 is positioned above in the figure by the urging force of the return spring 44, the amplifying valve disc 44a closes the output valve seat 46 while opening the ejection valve seat 47.

Thus, the pilot fluid in the first pressure chamber 11a is ejected from the pilot ejection port PE through the pilot output channel 48, the ejection valve seat 47, and the pilot ejection channel 49. The valve disc 14 is moved leftward in the figure by two forces, the impelling force of compressed air supplied to the second pressure chamber 12a through the return channel 29 and the urging force of the return spring 17, thereby allowing the supply port P to communicate with the second output port B while allowing the first output port A to communicate with the first ejection port EA.

When the solenoid 3a is magnetized, the pilot inlet port (p) and pilot output port (a) in the pilot valve 3 communicate mutually to supply a pilot fluid to the pressure chamber 50 in the amplifying valve 5. Then, the amplifying valve disc 43 moves downward to cause the amplifying valve disc 43a to open the output valve seat 46 while closing the ejection valve seat 47, thereby supplying an internal pilot fluid to the first pressure chamber 11a.

Thus, the difference in diameter between the two pistons 15 and 16 causes the valve disc 14 to move rightward in the figure, thereby allowing the supply port P to communicate with the first output port A while allowing the second output port B to communicate with the second ejection port EB.

When the solenoid 3a is demagnetized, the pilot output port (a) communicates with the pilot ejection port (r) to eject the pilot fluid supplied to the pressure chamber 59 in the amplifying valve 5, from the pilot ejection port PE to the exterior through the pilot ejection channel 49. Then, the urging force of the return spring 44 causes the amplifying valve disc 43 to move upward in the figure, thereby allowing the amplifying valve disc 43a to close the output valve seat 46 while opening the ejection valve seat 47.

Thus, the pilot fluid supplied to the first pressure chamber 11a is ejected from the pilot ejection port PE to the exterior through the pilot output channel 48, the ejection valve seat 47, and the pilot ejection channel 49. The combination of two forces, the impelling force of compressed air supplied to the second pressure chamber 12a and the urging force of the return spring 17, then causes the valve disc 14 to return to its original position, thereby allowing the supply port P to communicate with the output port B while allowing the first output port A to communicate with the first ejection port EA.

When the second body portion 7b is removed and installed again in the direction shown in FIG. 2B, after changing the switching plug 20 by 180°, the valve disc 31 closes the internal pilot valve seat 22 while the external pilot channel 26 and the pilot input channel 28 communicate mutually through the external pilot valve seat 23, thereby changing the directional control valve to the external pilot type. Accordingly, the pilot fluid is supplied from the external pilot port X through the pilot input channel 28 to the pilot valve 3 and the amplifying valve 5.

In the directional control valve 1A according to the first embodiment, the valve body 7 comprises the first and second body portions 7a and 7b, and the channels and the plug chamber 21 are formed by providing grooves and shallow dents in the first or second body portion 7a or 7b, making processing and assembly much simpler than in conventional products in which deep holes of different diameters or bent through-holes are formed inside a single body.

Furthermore, due to the presence of the amplifying valve 5, this embodiment requires only a small output of pilot fluid from the pilot valve 3 to drive the amplifying valve body 43 having a much smaller diameter than the valve disc 14 of the main valve 2, thereby reducing the size and costs of the pilot valve 3 driven by the solenoid 3a.

Figure 4:
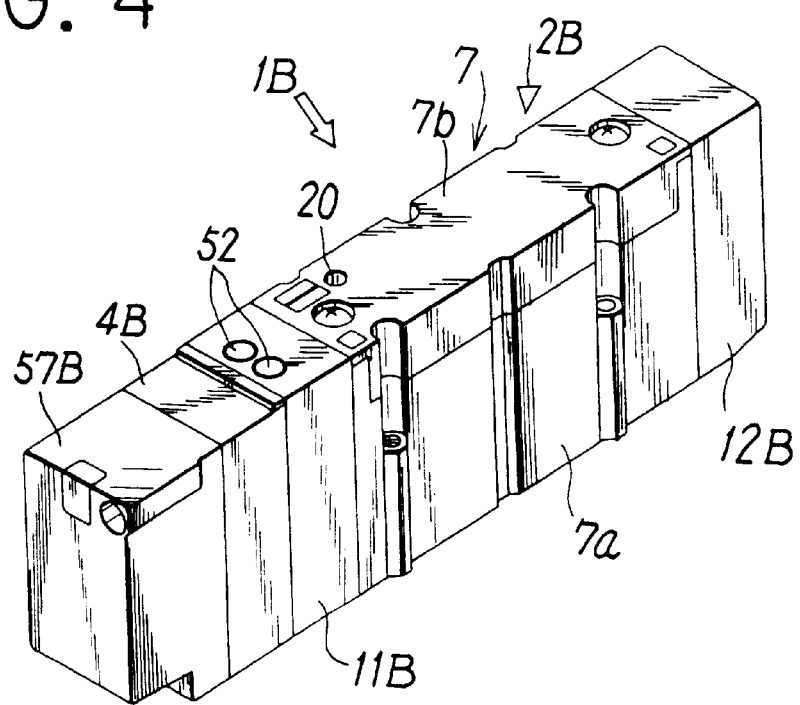
FIG. 4 is a perspective view showing a second embodiment of a directional control valve according to this invention.

FIG. 4 shows a second embodiment. A directional control valve 1B according to the second embodiment appears very similar to the directional control valve 1A according to the first embodiment, but is of a double-solenoid type and differs from the first embodiment in that a main valve is switched by two pilot valves. That is, in FIG. 4, the valve disc is switched by supplying a pilot fluid to the pistons provided in the first and second piston boxes 11B and 12B, respectively, on the respective sides of the main valve 2B, using the pilot valve and amplifying valve corresponding these pistons. In addition, two pilot valves are integrated inside a cover 57B, two amplifying valves are integrated inside an adapter plate 4B, and two manually operated devices 52 are integrated inside the first piston box 11B.

The second embodiment uses substantially the same switching mechanism as in the first embodiment to switch between the internal and external pilot types.

The directional control valves according to the above embodiments are all of a five-port type, but this invention is not limited to this type and four- or three-port types may be used as well.

What is claimed is:

1. A pilot-operated directional control valve comprising a main valve having a plurality of ports, a valve hole with which each of the ports communicates, and a valve disc slidably provided in the valve hole to switch channels; and at least one pilot valve that supplies a pilot fluid to the main valve to drive said valve disc, said main valve comprising an internal pilot channel branching from one of said ports; an external pilot channel leading to an external pilot port; a pilot input channel for guiding a pilot fluid to a pilot valve; and a switching plug that selectively connects the pilot input channel to the internal or external pilot channel, wherein:

a valve body of said main valve comprises a first body portion having each of said ports, a valve hole, and a valve disc; and a second body portion detachably mounted on a surface of the first body portion that is opposite to its port forming surface, and wherein some of the plurality of pilot fluid channels and a plug chamber in which said switching plug is accommodated are provided between the first body portion and the second body portion;

wherein said plug chamber is formed to extend across both said first and second body portions, wherein an external pilot valve seat leading to the external pilot channel is provided in a chamber portion formed in the first body portion while an internal pilot valve seat leading to the internal pilot channel is provided in a chamber portion formed in the second body portion, said pilot input channel being opened in a chamber portion located between both valve seats, said switching plug being accommodated in said plus chamber in such a way that its axial direction can be changed by 180°, the switching plug having a valve disc the direction of which is changed to selectively close one of said two valve seats; and a communication passage that allows an open valve seat and said pilot input channel to communicate mutually.

2. A directional control valve according to claim 1 wherein an amplifying valve that is switched by the pilot valve to supply or discharge a pilot fluid to or from said main valve is provided between said main valve and said pilot valve.

* * * * *